United States Patent
Liang

(10) Patent No.: US 7,066,392 B1
(45) Date of Patent: Jun. 27, 2006

(54) MULTIMEDIA CONNECTOR READER DEVICE

(76) Inventor: Hsien-Rong Liang, P.O. Box No. 6-57, Junghe, Taipei 235 (TW)

( * ) Notice: Subject to any disclaimer, the term of this patent is extended or adjusted under 35 U.S.C. 154(b) by 0 days.

(21) Appl. No.: 11/154,543

(22) Filed: Jun. 17, 2005

(51) Int. Cl.
G06F 7/08 (2006.01)

(52) U.S. Cl. ............... 235/486; 235/492; 235/381

(58) Field of Classification Search ........... 235/381, 235/492, 486, 487, 441; 361/685, 686, 715, 361/687, 83.3, 681
See application file for complete search history.

(56) References Cited

U.S. PATENT DOCUMENTS

| | | | | |
|---|---|---|---|---|
| 5,422,472 | A * | 6/1995 | Tavislan et al. | 235/472.01 |
| 6,229,964 | B1 * | 5/2001 | Bell | 396/310 |
| 6,712,266 | B1 * | 3/2004 | Bartley et al. | 235/380 |
| 7,002,084 | B1 * | 2/2006 | Cox et al. | 177/238 |
| 2001/0043458 | A1 * | 11/2001 | Aizawa et al. | 361/685 |
| 2002/0018335 | A1 * | 2/2002 | Koizumi | 361/687 |
| 2002/0175208 | A1 * | 11/2002 | Bartley et al. | 235/380 |
| 2003/0048589 | A1 * | 3/2003 | Tignor et al. | 361/93.3 |
| 2004/0066595 | A1 * | 4/2004 | Tignor et al. | 361/93.1 |
| 2004/0125571 | A1 * | 7/2004 | Chen | 361/715 |
| 2004/0246675 | A1 * | 12/2004 | Lin | 361/686 |
| 2005/0185374 | A1 * | 8/2005 | Wendel et al. | 361/685 |
| 2005/0269140 | A1 * | 12/2005 | Cox et al. | 177/238 |

* cited by examiner

Primary Examiner—Thien M. Le

(57) ABSTRACT

The present invention provides a multimedia connector reader device, wherein when a portable digital device is plugged into a connector interface within a holder slot, functionality of a transmission control circuit enables data stored in a memory card of the portable digital device to be accessed, and a connector port enables connectivity to another different type of portable digital device. Moreover, a switch controls whether the transmission control circuit of the multimedia connector reader device is actuated or not, while a controller enables accommodating different types of computer systems. An interior wireless transmission circuit and wireless transceiver interior enable wireless connection to the Internet. Furthermore, a touch display panel displays digital files stored in each connected digital device, and controls related file handling function.

8 Claims, 11 Drawing Sheets

MULTIMEDIA CONNECTOR READER DEVICE

BACKGROUND OF THE INVENTION (a) Field of the Invention

The present invention relates to a multimedia connector reader device. When a portable digital device is plugged into a connector interface within a holder slot, functionality of a transmission control circuit enables data stored in a memory card of the portable digital device to be accessed.

(b) Description of the Prior Art

Referring to FIG. 1, when using a personal stereo B1, in general, if a user needs to access data stored in a memory card H, then the personal stereo B1 must first be connected to a computer A with a connecting cable B11, and a card reader C is then connected to the computer A with a connecting cable C1. The computer A then functions as a transmission point for transmitting the data stored in the memory card H, which is not only troublesome in use, moreover, a computer facility or notebook computer is necessary in order to implement data transmission. Hence, such a method of transmitting data is not only time wasteful, but also adds to operating procedure required of the user.

Furthermore, there are a great variety of memory cards H in current se, however, in general, only the computer A or a notebook computer is able to read data stored in a memory card of the card reader C. Thus, with the various digital data devices in current use, it is extremely inconvenient for the user to transfer data stored in the various digital data devices in current use to the external memory card H. In addition, though the light, slim and small size of the card reader C facilitates easy portability, however, it is unable to directly connect to a digital data device such as the digital personal stereo B1, which causes considerable inconvenience to the user.

Hence, the inventor of the present invention proposes to resolve and surmount existent technical difficulties to eliminate the aforementioned shortcomings.

SUMMARY OF THE INVENTION

The present invention is to provide a multimedia connector reader device. When a portable digital device is plugged into a connector interface within a holder slot, functionality of a transmission control circuit enables data stored in a memory card of the portable digital device to be accessed, and a connector port enables connectivity to another different type of portable digital device. Moreover, a switch controls whether the transmission control circuit of the multimedia connector reader device is actuated or not.

A controller enables accommodating different types of computer systems. Furthermore, an interior wireless transmission circuit and wireless transceiver enable wireless connection to the Internet. In addition, a touch display panel displays digital files stored in each of the aforementioned digital devices, and includes functionality to control handling of the digital files.

To enable a further understanding of said objectives and the technological methods of the invention herein, brief description of the drawings is provided below followed by detailed description of the preferred embodiments.

DETAILED DESCRIPTION OF THE PREFERRED EMBODIMENTS

Figure 1:
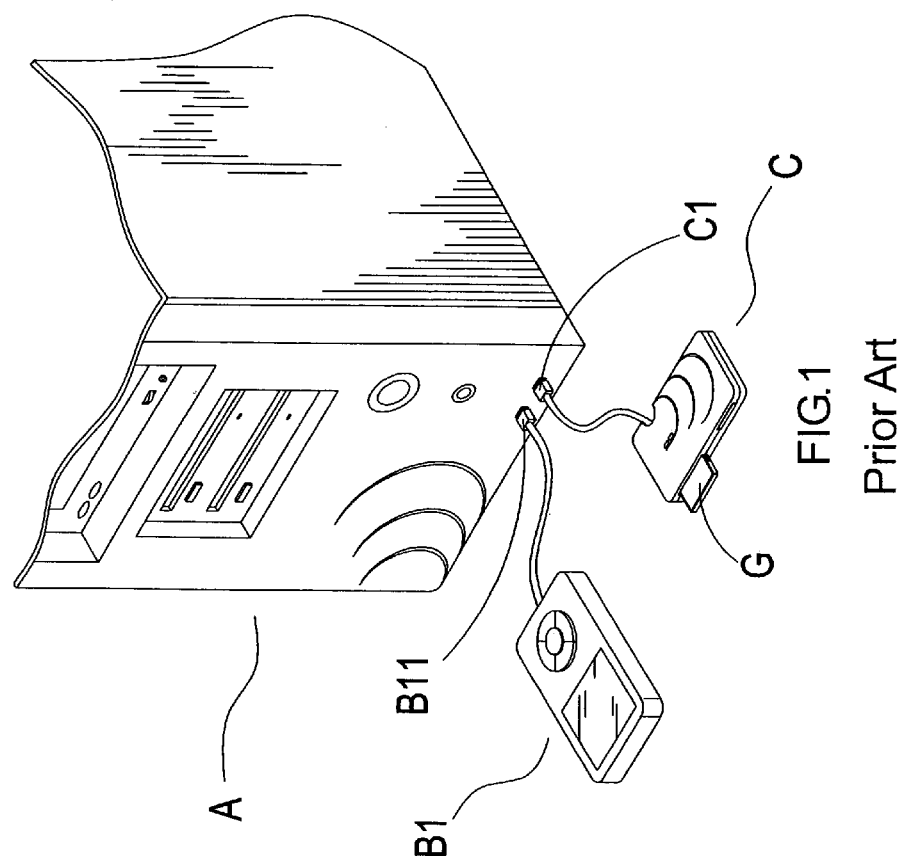
FIG. 1 shows a schematic view of the connection between a conventional personal digital storage device and a card reader.
Figure 2:
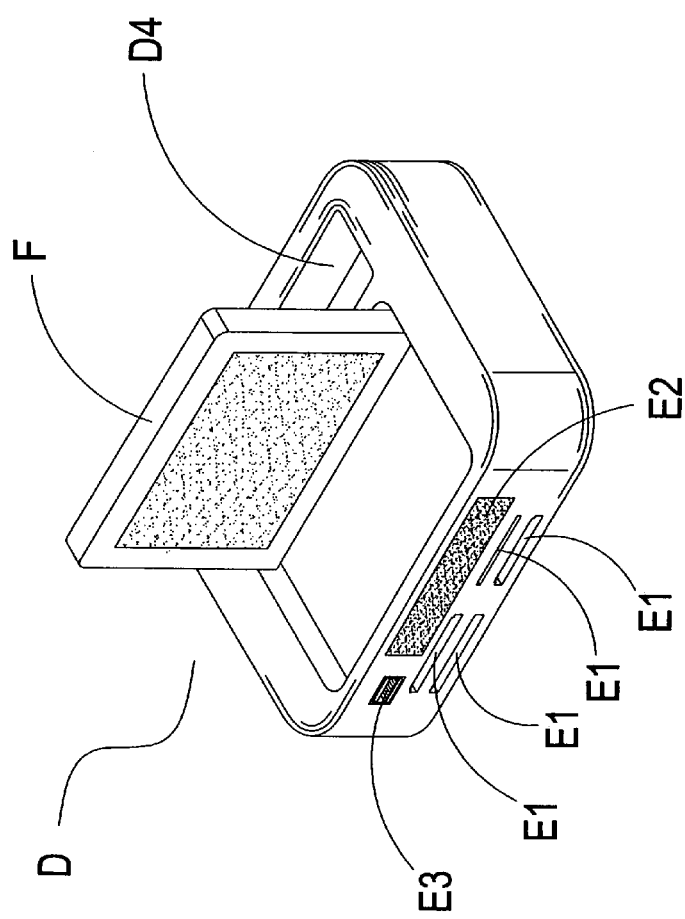
FIG. 2 shows a front elevational view according to the present invention.
Figure 3:
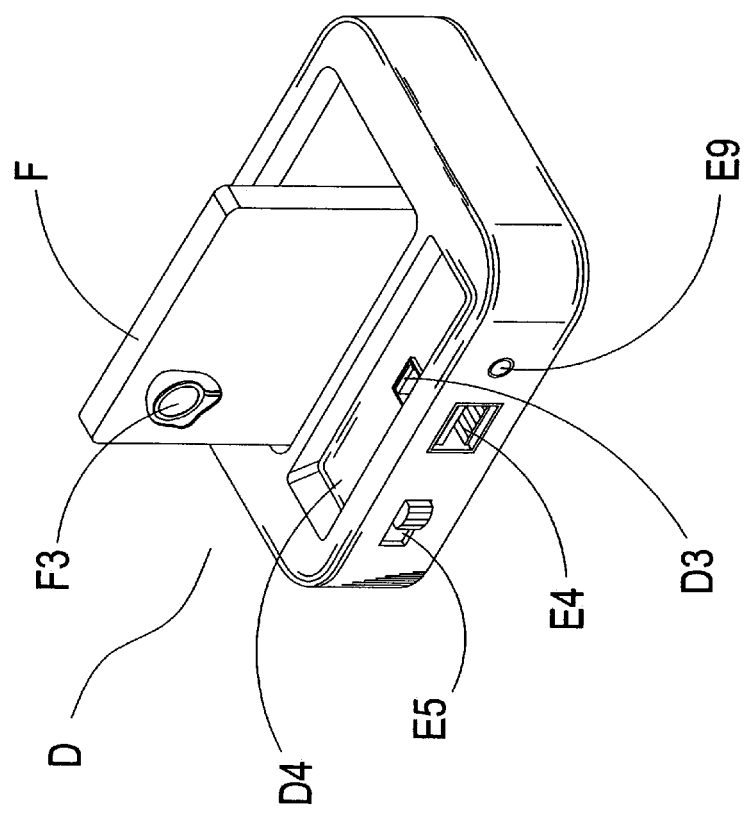
FIG. 3 shows a rear elevational view according to the present invention.
Figure 4:
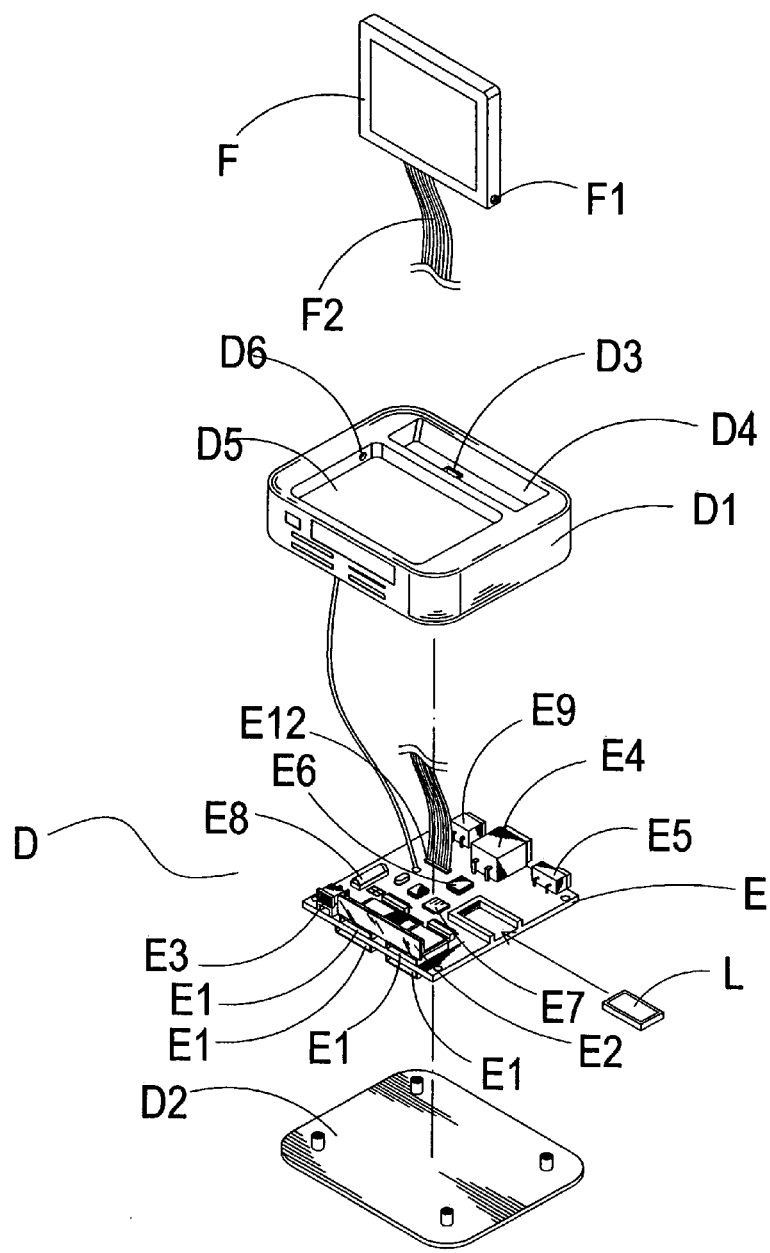
FIG. 4 shows an exploded elevational view according to the present invention.

Referring to FIGS. 2, 3 and 4, which show a multimedia connector reader device D of the present invention structured to comprise a casing D1, a base plate D2, a circuit board E, a touch display panel F and a hard disk L, wherein the circuit board E is disposed within the casing D1, and the base plate D2 is then fitted to the casing D1.

The casing D1 is configured with a connector interface D3, a holder slot D4, a groove D5 and locking latch sockets D6.

The touch display panel F is configured with connector locking latches F1, a signal flat cable F2 and an amplifier device F3. The connector locking latches F1 are respectively disposed within the locking latch sockets D6 of the casing D1, thereby installing the touch display panel F in the casing D1. Moreover, the signal flat cable F2 is connected to a signal connector interface E12 of the circuit board D.

The circuit board E is configured with slots E1, a liquid crystal display E2, a connector port E3, a system connector port E4, a switch E5, a central processing unit E6, a transmission control circuit E7, batteries E8, a connector E9, a wireless transmission circuit E10, a wireless transceiver E11 and the signal connector interface E12.

Figure 5:
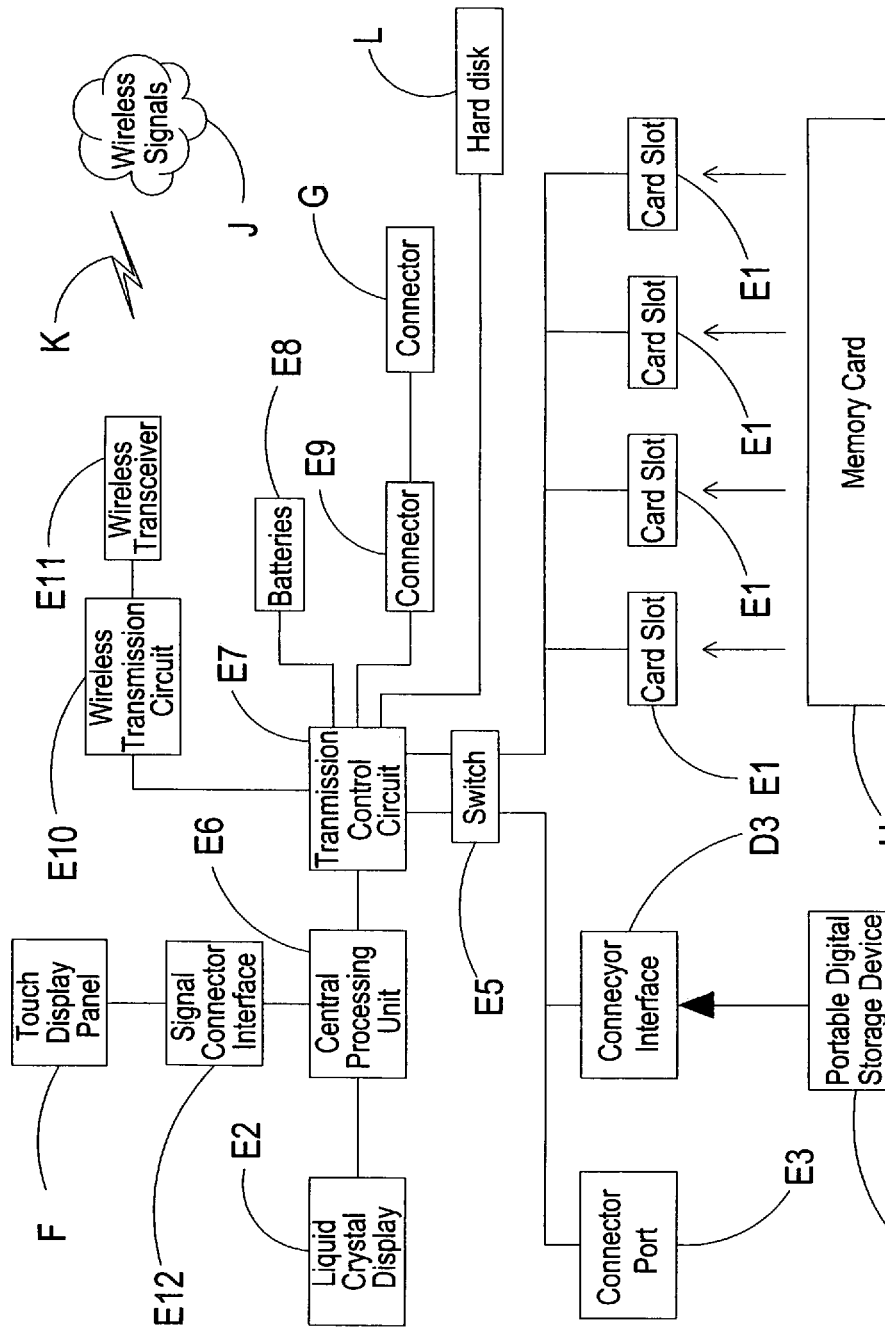
FIG. 5 shows a circuit block diagram according to the present invention.

Referring to FIG. 5, structure of the present invention is characterized in that the transmission control circuit E7 is connected to the central processing unit E6, and the switch E5 is connected to the connector interface D3, the connector port E3 and the slots E1. Furthermore, the central processing unit E6 controls signals displayed by the liquid crystal display E2 and data transmission between the card slots E1, the connector interface D3 and the connector port E3.

The wireless transmission circuit E10 and the wireless transceiver E11 are connected to the transmission control circuit E7, thereby enabling connection to the Internet J through wireless signals K.

When a portable digital device B, such as a PDA (Personal Digital Assistant), digital personal stereo, a portable hard drive, and so on, is plugged into the connector interface D3 of the holder slot D4, and a memory card H is inserted into one of the card slots E1, then functionality of the transmission control circuit E7 enables data stored in the memory card H of the portable digital device B to be transmitted to another different type of portable digital device B connected to the connector port E3. Furthermore, the switch E5 controls whether the transmission control circuit E7 of the multimedia connector reader device D is actuated or not.

The system connector port E4 can accommodate connection to different computer systems, such as AC (Macintosh), and so on, using a connecting cable, thereby enabling the computer to directly read the data stored in the memory card H.

The hard disk L is connected to the circuit board E, and control signals from the touch display panel F control the transmission control circuit E7, thereby enabling digital files stored in a connected portable digital device B, such as a PDA (Personal Digital Assistant), a digital personal stereo, a portable hard drive, and so on, to be transmitted and saved to the hard disk L or digital files stored on the hard disk L can be transmitted to the portable digital device B, such as a PDA (Personal Digital Assistant), a digital personal stereo, a portable hard drive, and so on).

The touch display panel F is connected to the central processing unit E6, and can display digital data stored in each of the aforementioned connected devices. In addition, the touch display panel F includes file handling functionality. Moreover, the display panel F is able to play multimedia files and broadcast sound signals through the rear amplifier device F3 (see FIG. 3).

The batteries E8 of the circuit board E supply needed working voltage to each component member of the circuit board E.

Figure 10:
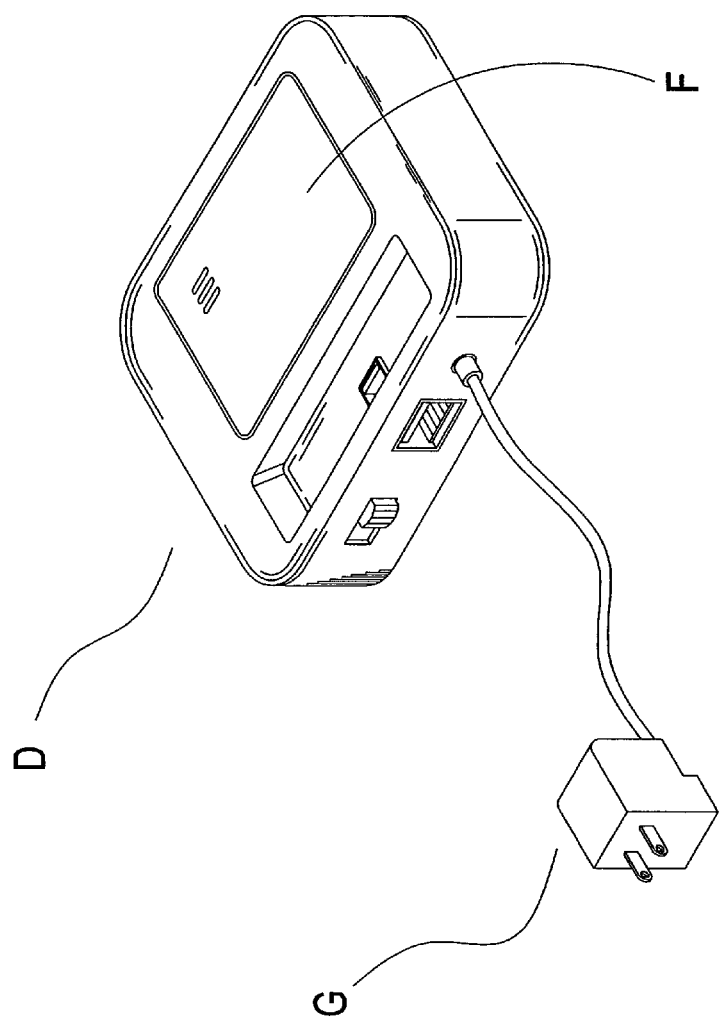
FIG. 10 shows a fifth embodiment according to the present invention.

Furthermore, after connecting a transformer G to the connector E9 (see FIG. 10), the batteries E8 can be charged via an external power supply or, when the multimedia connector reader device D is connected to a computer facility, the transmission control circuit E7 controls the connector port E3 to enable the power supply within the computer to charge the batteries E8.

The hard disk L can use an IDE interface (Integrated Device Electronics); a SCSI interface (Small Computer Standard Interface), a SATA interface (Serial Advanced Technology Attachment) and related hard disk transmission connector interface specifications.

The transmission control circuit E7 can be configured to use USB-OTG (Universal Serial Bus-ON-TO-GO) and related transmission interface integrated control circuits.

Figure 6:
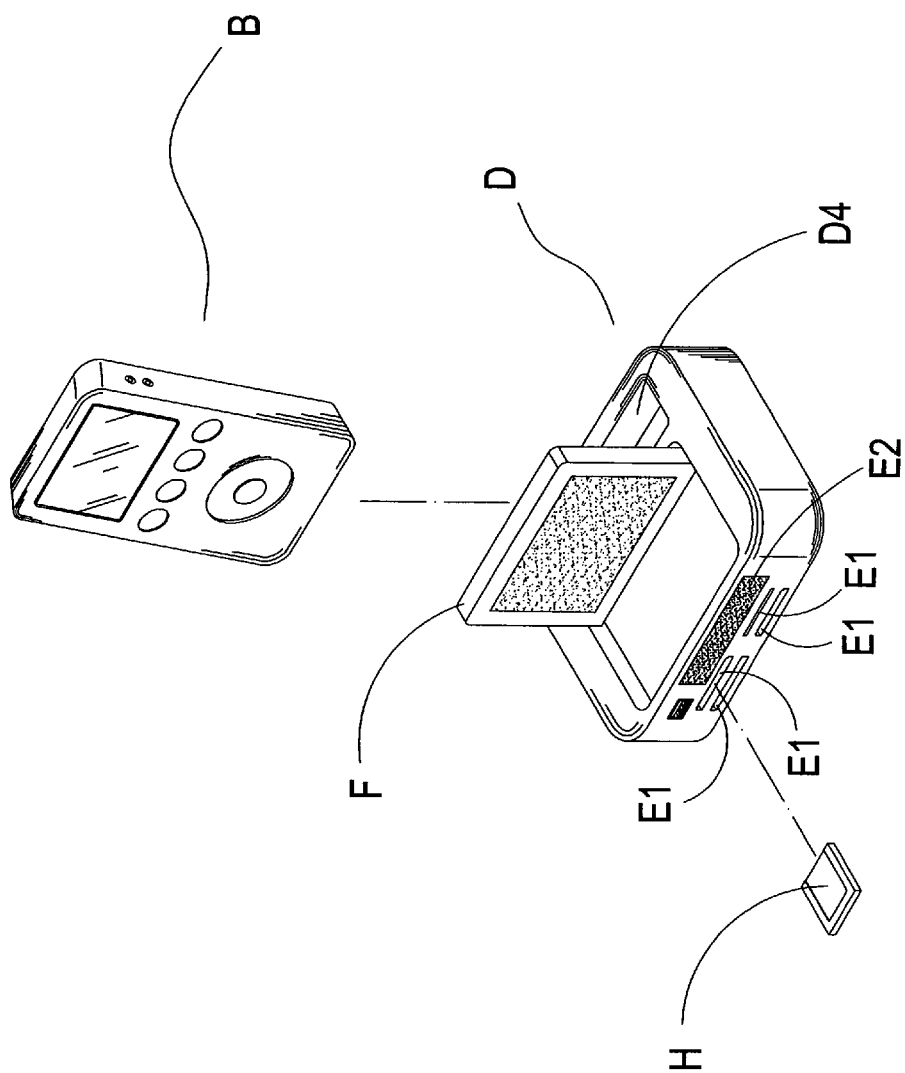
FIG. 6 shows a first embodiment according to the present invention.

Referring to FIG. 6, which shows an embodiment of a multimedia connector reader device D of the present invention, wherein, after a digital personal stereo B is inserted into a holder slot D4 of the multimedia connector reader device D and connected to a connector interface D3 of the holder slot D4, a memory card H is then inserted into one of a plurality of slots E1, thereby enabling the digital personal stereo B to access data stored in the memory card H or save data to the memory card H. Hence, the need to use a large-sized device such as a computer is eliminated. Furthermore, a liquid crystal display E2 displays the present working state, for instance, type, name, size, and so on, of a file being transmitted. Moreover, a touch display panel F can directly play digital multimedia files stored in the digital personal stereo B.

Figure 7:
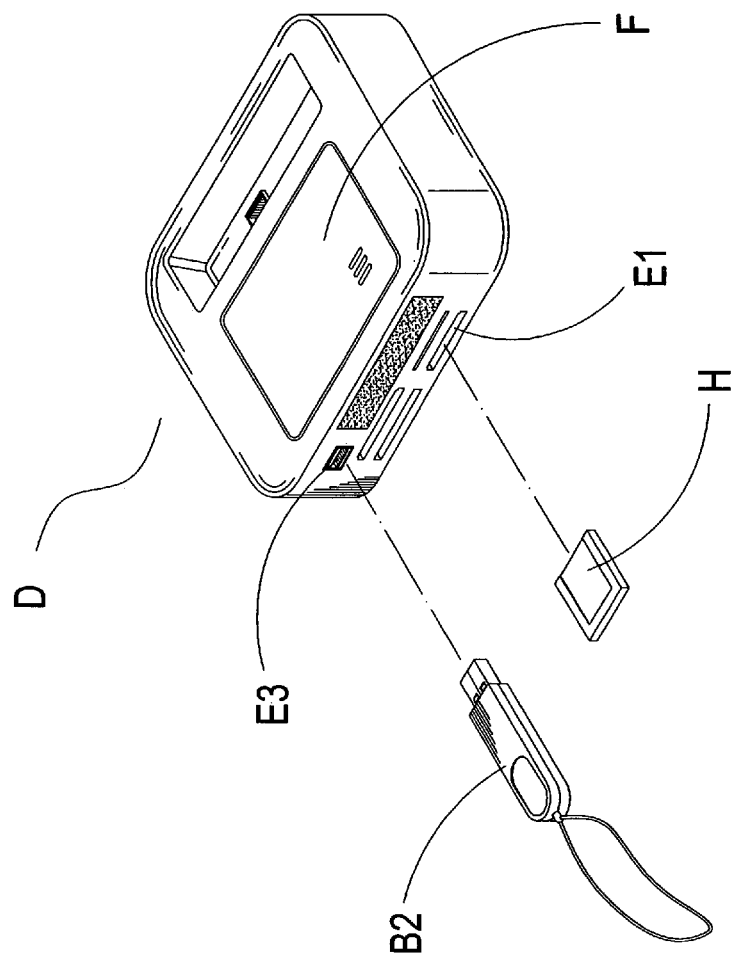
FIG. 7 shows a second embodiment according to the present invention.

Referring to FIG. 7, after a mobile disk B2 is inserted into a connector port E3 of the multimedia connector reader device D, and the memory card H is inserted into one of the slots E1, the mobile disk B2 is able to access data stored in the memory card H or save data to the memory card H thereby eliminating the need to use a large-sized device such as a computer, and so on. Furthermore, the liquid crystal display E2 displays the present working state, for instance, type, name, size, and so on, of a file being transmitted. Moreover, the touch display panel F can directly play digital multimedia files stored in the mobile disk B2.

Figure 8:
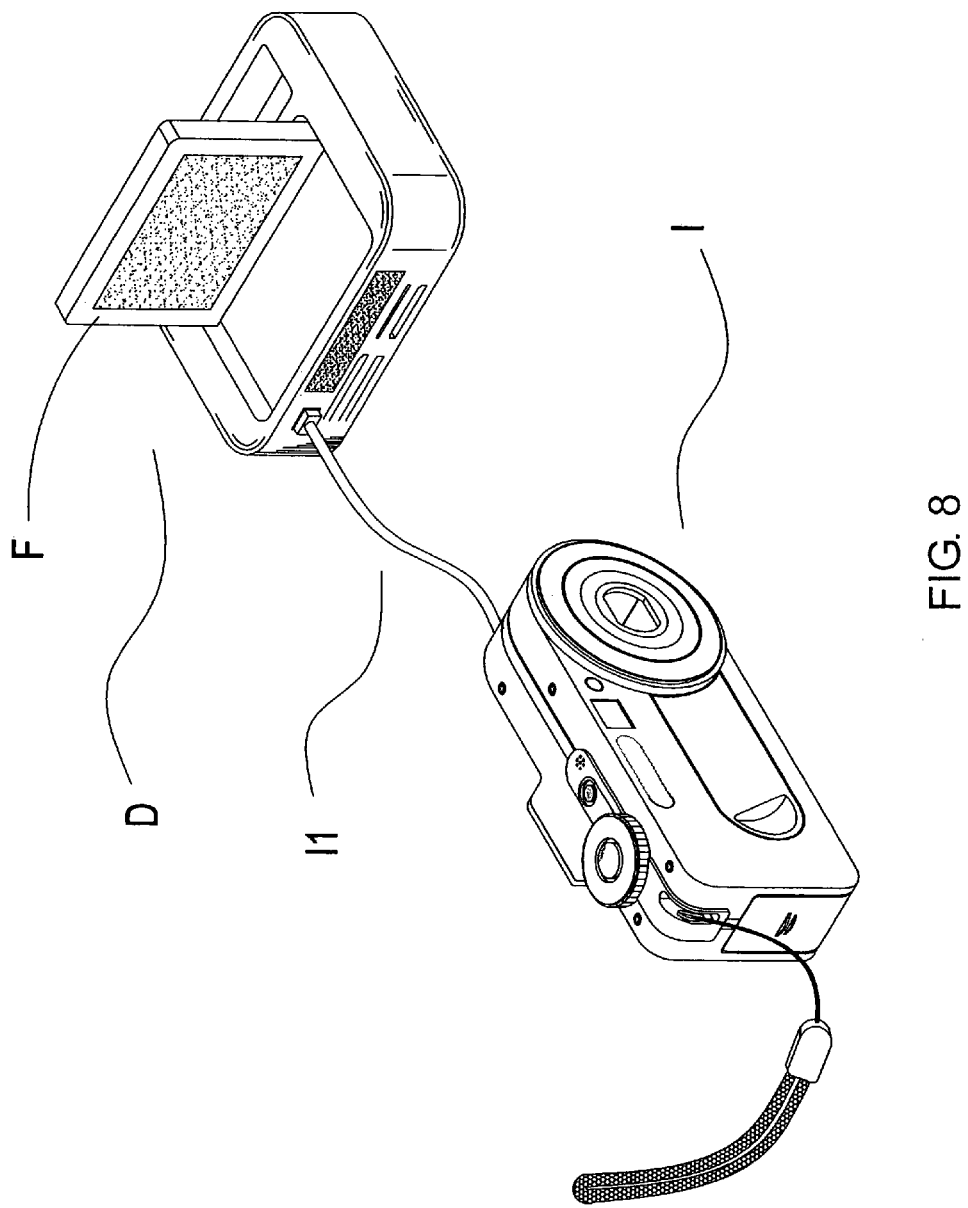
FIG. 8 shows a third embodiment according to the present invention.

Referring to FIG. 8, which shows a connecting cable 11 of a digital camera I connected to the connector port E3 of the multimedia connector reader device D. After the memory card H is inserted into one of the slots E1, images and sound files stored in the digital camera I can be transmitted and saved to the memory card H, thereby eliminating the need to use a large-sized device such as a computer, and so on. Furthermore, the liquid crystal display E2 displays the present working state, for instance, type, name, size, and so on, of a file being transmitted. Moreover, the touch display panel F can directly play digital multimedia files stored in the digital camera 1.

Figure 9:
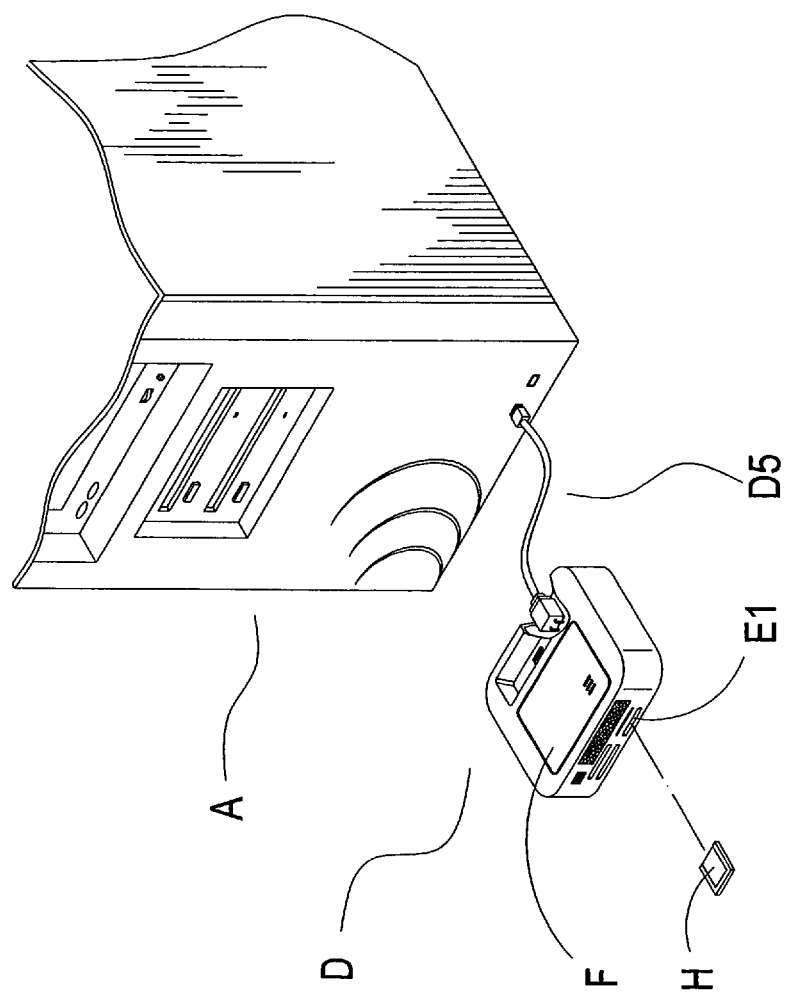
FIG. 9 shows a fourth embodiment according to the present invention.

Referring to FIG. 9, which shows a system connector port E4 of the multimedia connector reader device D connected to a computer A with a connecting cable D7, thereby enabling the computer A to read data from and write data to the memory card H. Moreover, a plurality of the slots E1 are configured to allow inserting the memory cards H having different specifications, thereby enabling the computer A to simultaneously read data from the memory cards H having different specifications.

Figure 11:
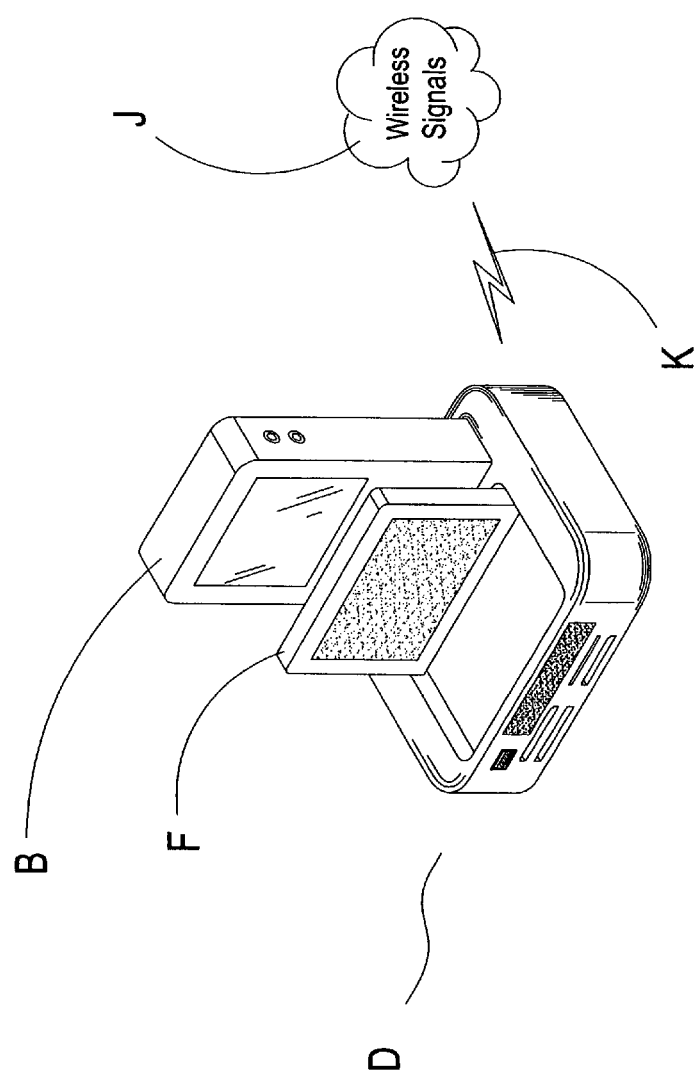
FIG. 11 shows a sixth embodiment according to the present invention.

Referring to FIG. 11, which shows the multimedia connector reader device D connected to the Internet J through wireless signals K, thereby enabling the connected memory card H to store data from the Internet J or the digital data device B to directly access digital files on the Internet J. Furthermore, the touch display panel F directly displays the contents of web pages on the Internet J, and, moreover, is able to access files and broadcast digital files from the Internet J.

In order to accommodate different wireless transmission signal equipment, a wireless transmission circuit E10 and a wireless transceiver E11 of a circuit board E can be configured to use infrared rays, Bluetooth, FM (frequency modulation), AM (amplitude modulation), GPS (general packet radio service), CDMA (Code Division Multiple Access), GSM (Global System for Mobile Communications), and related wireless signal transmission technology to transmit signals.

Moreover, in order to use a wireless network to connect to the Internet J, the wireless transmission circuit E10 and the wireless transceiver E11 can be further configured to conform to 802.11 wireless network specifications and related wireless transmission connected wide-range wireless network standards.

In order to better explicitly disclose advancement and practicability of the present invention, a comparison with conventional art is described hereinafter:

SHORTCOMINGS OF PRIOR ART

1. A conventional card reader is unable to directly connect to a digital data device, for instance, a PDA (Personal Digital Assistant), a digital personal stereo, a mobile hard disk, and so on.

2. A conventional card reader is unable to accommodate different operating systems to access data stored in a memory card of the card reader.

3. Does not provide for connectivity and mutual access between card readers.

ADVANTAGES OF THE PRESENT INVENTION

1. Able to connect to different types of digital data devices, for instance, a PDA (Personal Digital Assistant), a digital personal stereo, a mobile hard disk, and so on.
2. Able to directly access data stored in a digital data device.
3. Enables a digital data device to directly read data stored in memory cards.
4. Compatible with operating systems of different specifications.
5. Provided with advancement, practicability and convenience.
6. Enhances industrial competitiveness.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A multimedia connector reader device comprising a casing, a base plate, a circuit board, a touch display panel and a hard disk, wherein the circuit board is disposed within the casing, and the base plate is then fitted to the casing;
    wherein the casing is configured with a connector interface, a holder slot, a groove and locking latch sockets;
    wherein the touch display panel is configured with connector locking latches, a signal flat cable and an amplifier device, the connector locking latches are respectively disposed within the locking latch sockets of the casing, thereby installing the touch display panel in the casing, moreover, the signal flat cable is connected to a signal connector interface of the circuit board;
    wherein the circuit board is configured with slots, a liquid crystal display, a connector port, a system connector port, a switch, a central processing unit, a transmission control circuit, batteries, a connector, a wireless transmission circuit, a wireless transceiver and the signal connector interface;
    and characterized in that the transmission control circuit is connected to the central processing unit, and the switch is connected to the connector interface, the connector port and the slots, furthermore, the central processing unit controls signals displayed by the liquid crystal display and data transmission between the card slots, the connector interface and the connector port;
    the wireless transmission circuit and the wireless transceiver are connected to the transmission control circuit, thereby enabling connection to the Internet through wireless signals;
    when a portable digital device is plugged into the connector interface of the holder slot, and after a memory card is inserted into one of the card slots, then functionality of the transmission control circuit enables data stored in a memory card of the portable digital device to be accessed, and a connector port enables connectivity to another different type of portable digital device, furthermore, the switch controls whether the transmission control circuit of the multimedia connector reader device is actuated or not;
    the system connector port can accommodate connection to different computer systems using a connecting cable, thereby enabling different computer systems to directly read the data stored in the memory card;
    the hard disk is connected to the circuit board, and control signals from the touch display panel control the transmission control circuit, thereby enabling digital files stored in a connected portable digital device to be transmitted and saved to the hard disk or digital files stored on the hard disk can be transmitted to the portable digital device;
    the touch display panel is connected to the central processing unit, and can display digital data stored in each of the portable digital devices connected to the multimedia connector reader device, in addition, the touch display panel includes file handling functionality, moreover, is able to play multimedia files and broadcast sound signals through a rear amplifier device.

2. The multimedia connector reader device as described in claim 1, wherein the batteries of the circuit board supply needed working voltage to each component member of the circuit board, furthermore, after connecting a transformer to the connector, the batteries can be charged via an external power supply;
    when the multimedia connector reader device is connected to a computer facility, the transmission control circuit controls the connector port to enable the power supply within the computer to charge the batteries, which can be carbon-zinc batteries, alkaline batteries, mercury batteries, nickel-metal hydride batteries, lithium batteries, and other related batteries used to supply power to electronic appliances.

3. The multimedia connector reader device as described in claim 1, wherein the type of memory card the slots can accommodate include a CF card (Compact Flash Memory Card), Type-I CF card, Type-II CF card, MS card (Memory Stick Memory Card), MGMS card (Magic Gate Memory Stick Memory Card), Dou-MS card (Duo Memory Stick Memory Card), Pro-MS card (Pro Memory Stick Memory Card), MMC card (Multi Media Memory Card), MMC4.0 card (Multi Media Memory Card Ver 4.0), RSMMC card (Reduced Size Multi Media Memory Card), SD card (Secure Digital Memory Card), Mini SD card (Mini Secure Digital Memory Card), SM card (Smart Media Memory Card), XD card (extreme Digital Picture Memory Card), and related digital data storage media.

4. The multimedia connector reader device as described in claim 1, wherein the connector port and the connector interface can be configured as a USB (Universal Serial Bus) connector port, IEEE1394 (Institute of Electrical and Electronic Engineers Standard Bus Interface), SATA and related digital data transmission connector ports as used in electronic machinery.

5. The multimedia connector reader device as described in claim 1, wherein the digital device can be a PDA, a digital personal stereo, a mobile disk, a digital camera, a notebook computer, a desktop computer, a printer, a multifunction printer, and related computer digital data equipment.

6. The multimedia connector reader device as described in claim 1, wherein the wireless transmission circuit and the wireless transceiver can be configured to accommodate different wireless transmission equipment by using infrared rays, Bluetooth, FM, AM, GPRS (General Packet Radio Service), CDMA, GSM, and related wireless signal transmission technology to transmit signals;
    moreover, the wireless transmission circuit and the wireless transceiver can be further configured to conform to 802.11 wireless network specifications and related wireless transmission connected wide-range wireless network standards.

7. The multimedia connector reader device as described in claim 1, wherein the transmission control circuit is configured to use USB-OTG and related transmission interface integrated control circuits.

8. The multimedia connector reader device as described in claim 1, wherein the hard disk uses an IDE interface, a SCSI interface, a SATA interface and related hard disk transmission connector interface specifications.

* * * * *